No. 790,933. PATENTED MAY 30, 1905.
F. J. TALBOT.
MEANS FOR PURIFYING AIR.
APPLICATION FILED MAY 31, 1904.

3 SHEETS—SHEET 1.

Witnesses:
Wm. P. Hammond
Geo. A. Kochrich

Inventor:
Frederick J. Talbot
By Knight Bros.
Attys

No. 790,933. PATENTED MAY 30, 1905.
F. J. TALBOT.
MEANS FOR PURIFYING AIR.
APPLICATION FILED MAY 31, 1904.

3 SHEETS—SHEET 3.

Witnesses:
Wm P Hammond
Geo. A. Kocbrick

Inventor:
Frederick J. Talbot.
By Knight Bros.
Attys

No. 790,933.

Patented May 30, 1905.

UNITED STATES PATENT OFFICE.

FREDERICK JOHN TALBOT, OF SHEFFIELD, ENGLAND.

MEANS FOR PURIFYING AIR.

SPECIFICATION forming part of Letters Patent No. 790,933, dated May 30, 1905.

Application filed May 31, 1904. Serial No. 210,499.

*To all whom it may concern:*

Be it known that I, FREDERICK JOHN TALBOT, a subject of the King of Great Britain, residing at Sheffield, in the county of York, England, have invented certain new and useful Means for Purifying Air, of which the following is a full, clear, and exact description.

The invention relates to improved means for purifying air.

I will describe my invention by the aid of the accompanying drawings, in which—

Figure 1:
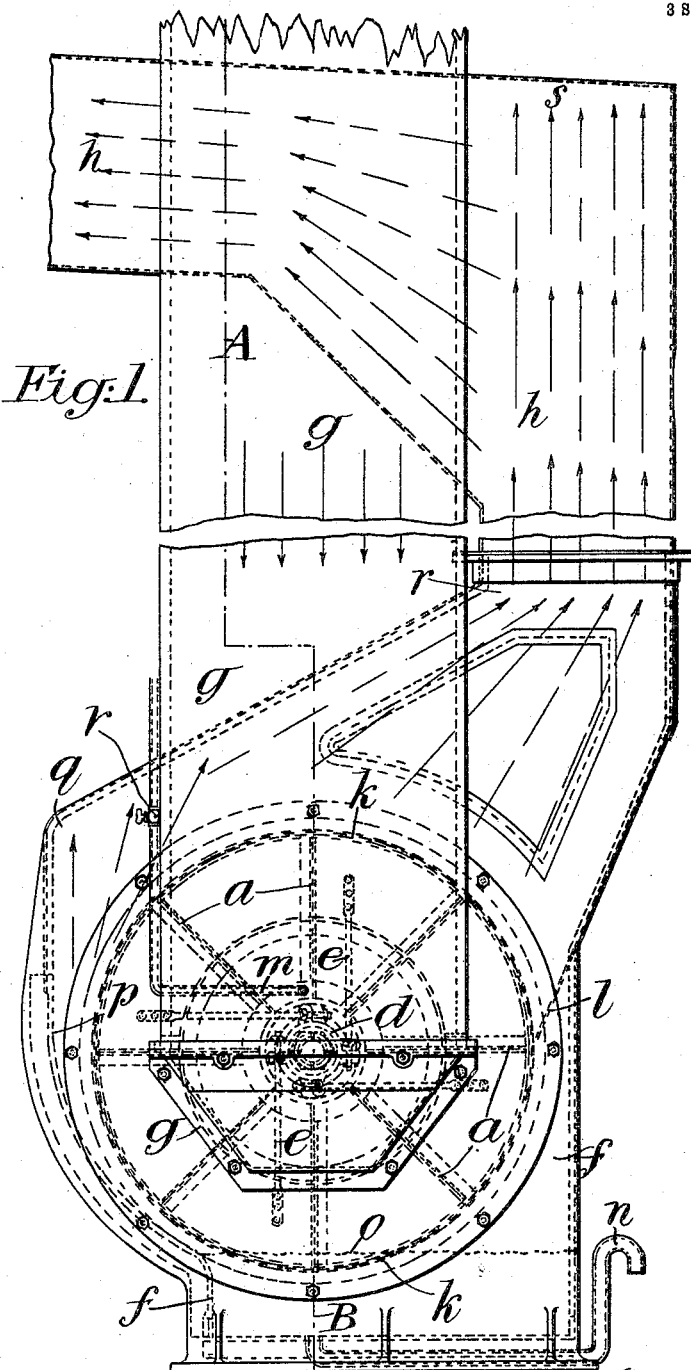
Figure 2:
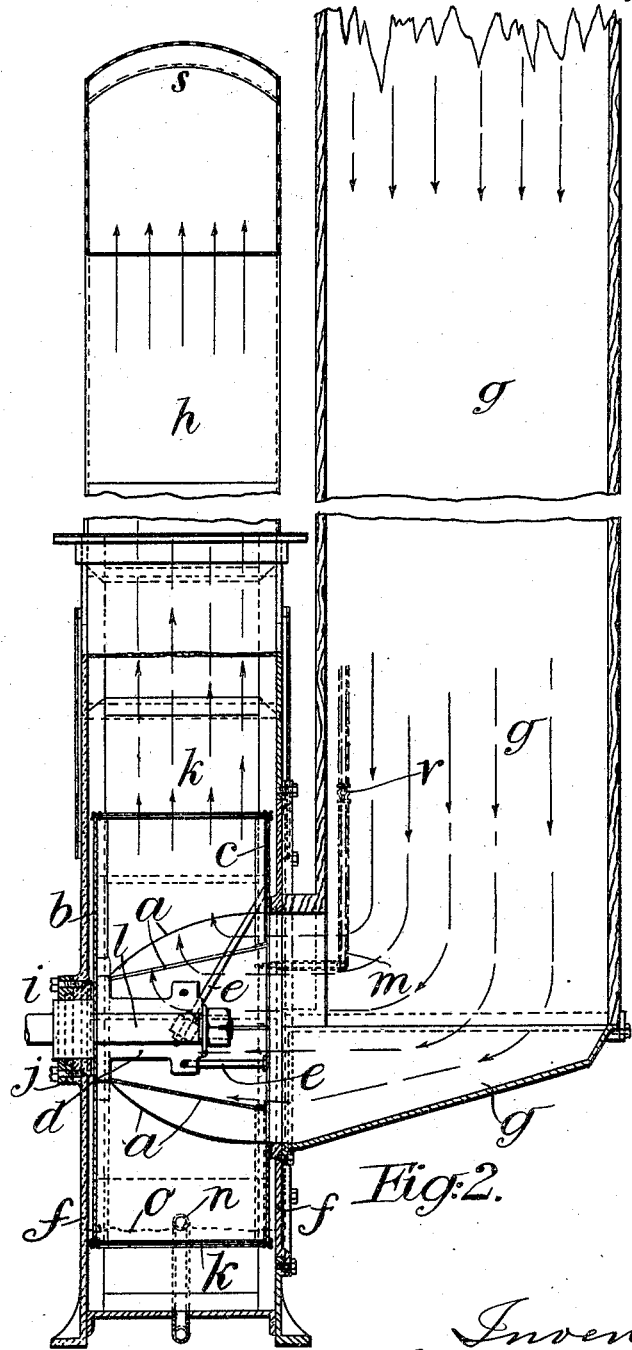
Figure 3:
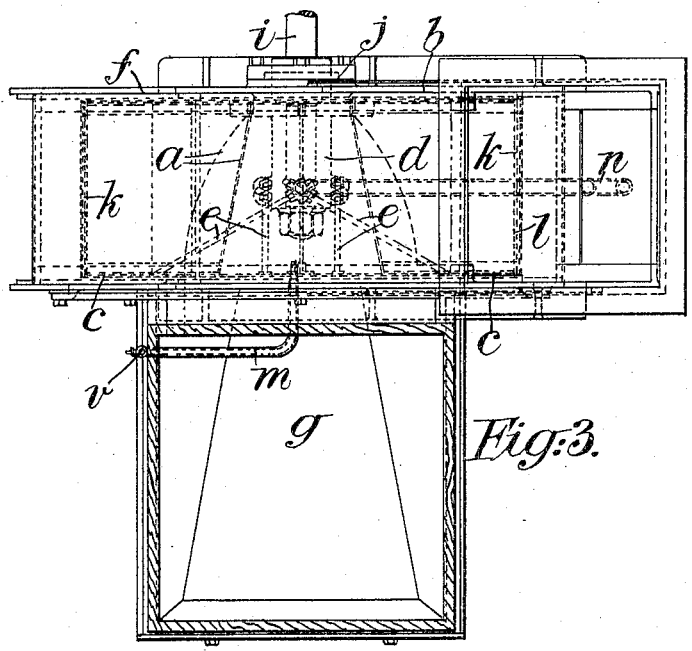

Figure 1 is a side elevation of my improved means or apparatus for purifying air. Fig. 2 is a vertical section drawn on the line A B of Fig. 1, and Fig. 3 is a plan with the air-tube from the fan removed.

I employ a fan consisting of vanes $a$, disks $b$ $c$, inclosing the sides of the fan and to which the vanes are fixed, a nave, hub, or boss $d$, to which the disk $b$ is fixed, and tie-rods $e$, connecting the disk $c$ to said nave, hub, or boss. The fan is inclosed in a chamber $f$, to which is connected an inlet air-duct $g$ and an outlet air pipe or duct $h$ to convey the purified air to the desired point or points. The nave, hub, or boss $d$ of the fan is fixed to a driving-shaft $i$, mounted in bearings one of which may be attached to the fan-inclosing chamber, and said fan is driven by any suitable means. $j$ is a stuffing-box to exclude air, &c., and prevent escape of water, &c. The fan is preferably completely inclosed on one side by the disk $b$, while the other side is inclosed by the disk $c$, except at the center, which is kept open for the admission of air to the fan from the inlet air-duct $g$; but, if desired, a central air-inlet opening may be made in each disk. Around the outer extremity of the vanes $a$ or periphery of the fan is wrapped wire-gauze $k$ or other permeable material, of which three thicknesses are preferably employed, fixed at a short distance apart. The lower part of the fan-inclosing chamber $f$ forms a water-tank through which the periphery of the fan passes. On one side of said chamber $f$, underneath the outlet air pipe or duct $h$, is fixed an internal plate or diaphragm $l$, extending therefrom so as almost to touch the periphery of the fan, preferably slightly above its center, and thus form a water seal to the air, as hereinafter described.

A small quantity of clean water is constantly supplied to the interior of the fan by a pipe $m$, fitted with a regulating-valve $v$, and the dirty water runs off from the fan-casing through a bent pipe $n$, so that the level of the water is constantly maintained at about the line $o$. On the delivery side of the fan, from the water-line $o$ to a point $p$ somewhat above the center of the fan, the fan-casing $f$ is of the ordinary shape—that is, it gradually recedes from the fan, so as to leave a gradually-enlarged air-space between the periphery of the fan and the casing. The fan-casing from the point $p$ is more suddenly and considerably enlarged, preferably by rising in a vertical or nearly vertical direction from the point $p$ to the point $q$, whence the casing is inclined to the point $r$, above which the vertical portion of the outlet air pipe or duct $h$ is fixed. This results in a fine spray being produced.

The operation of the apparatus is as follows: The fan is run at a suitable speed, and the water picked up by the gauze or like periphery $k$ of the fan is ejected with the air by centrifugal force in the form of fine spray, which fills not only the casing of the fan, but also the vertical portion of the outlet air pipe or duct $h$ in such a way that all air passing through it is thoroughly washed and purified at a trifling cost. The lower part of the outlet air pipe or duct $h$ and adjoining part of the fan-casing above the center of the fan being shaped from $p$ to $r$ substantially as above described, and the upper part $s$ of the outlet air pipe or duct being bent at an angle or to a radius, and the top, as shown in Fig. 2, being rounded, so that drops of water flow to the sides thereof, the air, which is heavily charged with water when projected against them by the action of the fan, has the water knocked out of it, which descends to the water seal at $l$, where it acts to trap the air at that point and helps to insure the air being forced up the outlet pipe or duct $h$. Very little moisture escapes beyond the top of the vertical portion of the air pipe or duct $h$. In cold weather a heater of any suitable character is provided, through which the air finally passes before entering the place in which it is required.

The fan, with its permeable periphery passing through water, as above described, acts as a fan and self-cleansing air-filter combined.

Having fully described my invention, what I claim, and desire to secure by Letters Patent, is—

1. In means for purifying air the combination of a power-driven fan comprising vanes, disks inclosing the sides of the vanes, and a central air-inlet opening, a permeable material around the outer extremity of the vanes or periphery of the fan, a casing inclosing said fan, a water-tank at the lower part of said casing through which the periphery of the fan passes, a diaphragm extending from one side of the fan-casing nearly to the periphery of the fan forming a water seal and an air-delivery pipe or duct substantially as herein set forth.

2. In means for purifying air the combination of a power-driven fan comprising vanes, disks inclosing the sides of the vanes, forming a water seal and a central air-inlet opening, a permeable material around the outer extremity of the vanes or periphery of the fan, a casing inclosing said fan, a water-tank at the lower part of said casing through which the periphery of the fan passes, a diaphragm extending from one side of the fan-casing nearly to the periphery of the fan, an air-delivery pipe or duct, a sudden enlargement of the fan-casing above the ordinary gradual enlargement and angular or rounded parts in the delivery pipe or duct substantially as herein set forth.

In witness whereof I have hereunto set my hand in presence of two witnesses.

FREDERICK JOHN TALBOT.

Witnesses:
    J. H. CHAPMAN,
    E. CROWTHER.